United States Patent
Park et al.

(10) Patent No.: US 8,675,691 B2
(45) Date of Patent: Mar. 18, 2014

(54) ADDED INFORMATION INSERTION APPARATUS AND METHOD IN BROADCASTING SYSTEM

(75) Inventors: Sung-Ik Park, Daejeon (KR); Heung-Mook Kim, Daejeon (KR); Young-Woo Suh, Seoul (KR); Jaekwon Lee, Seoul (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 226 days.

(21) Appl. No.: 13/131,188

(22) PCT Filed: Oct. 29, 2009

(86) PCT No.: PCT/KR2009/006288
§ 371 (c)(1),
(2), (4) Date: May 25, 2011

(87) PCT Pub. No.: WO2010/062042
PCT Pub. Date: Jun. 3, 2010

(65) Prior Publication Data
US 2011/0228865 A1 Sep. 22, 2011

(30) Foreign Application Priority Data
Nov. 26, 2008 (KR) .......................... 10-2008-0118019

(51) Int. Cl.
*H04J 3/06* (2006.01)
*H04N 7/12* (2006.01)
*H04N 5/38* (2006.01)
*H04B 1/00* (2006.01)

(52) U.S. Cl.
USPC ...... 370/510; 370/509; 348/723; 375/240.28; 455/63.1

(58) Field of Classification Search
None
See application file for complete search history.

(56) References Cited

U.S. PATENT DOCUMENTS 3,885,217 A 5/1975 Cintron
6,185,255 B1 * 2/2001 Twitchell et al. ........ 375/240.25
(Continued)

FOREIGN PATENT DOCUMENTS

DE 41 38770 5/1993
DE 43 41 211 4/1995
(Continued)

OTHER PUBLICATIONS

International Search Report mailed Jul. 19, 2011 in corresponding International Patent Application PCT/KR2009/006288.
Written Opinion of the International Searching Authority mailed Jul. 19, 2011 in corresponding International Patent Application PCT/JP2009/006288.

*Primary Examiner* — Hassan Phillips
*Assistant Examiner* — Hicham Foud
(74) *Attorney, Agent, or Firm* — Staas & Halsey LLP (57) ABSTRACT

The embodiments provide an additional information insertion apparatus for a broadcasting system. The system includes a broadcasting signal transmitter configured to transmit a broadcasting signal along with a data extractor configured to extract a modulated signal by dividing the modulated signal from a modulator of the broadcasting signal transmitter. An additional data generator is configured to extract synchronization of the broadcasting signal from the extracted broadcasting signal, modulate the additional information based on the extracted synchronization, and generate a level of the modulated additional information to be a smaller level than a signal level of the modulated signal by as much as a predetermined value. A data synthesizer is provided to insert the additional data from the data generator into the modulated broadcasting signal.

15 Claims, 8 Drawing Sheets

(56) References Cited

U.S. PATENT DOCUMENTS

| | | | |
|---|---|---|---|
| 6,347,216 B1* | 2/2002 | Marko et al. | 455/12.1 |
| 7,202,914 B2 | 4/2007 | Wu et al. | |
| 7,792,156 B1* | 9/2010 | Lee et al. | 370/510 |
| 2005/0117070 A1 | 6/2005 | Wu et al. | |
| 2006/0067429 A1 | 3/2006 | Beyer et al. | |
| 2007/0245207 A1 | 10/2007 | Ji et al. | |
| 2009/0070847 A1* | 3/2009 | Furman et al. | 725/131 |
| 2010/0231803 A1* | 9/2010 | Citta et al. | 348/723 |
| 2012/0177063 A1 | 7/2012 | Kim et al. | |

FOREIGN PATENT DOCUMENTS

| | | |
|---|---|---|
| EP | 1 551 107 | 7/2005 |
| KR | 1999-0041388 | 6/1999 |
| KR | 10-2002-0033270 | 6/2002 |
| KR | 10-2003-0095724 | 12/2003 |
| KR | 10-2007-0099384 | 10/2007 |
| KR | 10-2007-0119350 | 12/2007 |
| WO | 2007/114600 A1 | 10/2007 |
| WO | 2007/145410 A1 | 12/2007 |

* cited by examiner

ADDED INFORMATION INSERTION APPARATUS AND METHOD IN BROADCASTING SYSTEM

CROSS REFERENCE TO RELATED APPLICATIONS

This application is a national phase application, under 35 U.S.C. 371, of international application No. PCT/KR2009/006288, filed on Oct. 29, 2009, which claimed priority to Korean Patent Application No. 10-2008-0118019, filed on Nov. 26, 2008, the disclosures of which are incorporated herein by reference.

TECHNICAL FIELD

The present invention relates to an apparatus and method for inserting information in a broadcasting system; and, more particularly, to an apparatus and method for inserting additional information in a broadcasting system.

BACKGROUND ART

Current available broadcasting services have various types. Such types of broadcasting services have been advanced from an analog type broadcasting service to a digital type broadcasting service. The digital type broadcasting service provides high quality broadcasting services with diverse audio-visual information. Hereinafter, the analog type broadcasting service and the digital type broadcasting service will be described.

Conventional analog type broadcasting uses a multiple frequency network (MFN) in shadow areas of a broadcasting station and a secondary station in order to prevent same frequency interference. The MFN changes a channel using frequencies different from a central frequency to provide a broadcasting service. Since the MFN allocates different frequency to each service to provide broadcasting services, no channel interference occurs. Accordingly, the MFN may be an ideal network for providing a broadcasting service if frequency resources are not limited. However, it is difficult to use the MFN due to limitation of available frequency resources. In order to overcome the shortcoming of the MFN, single frequency network (SFN) was introduced for effectively using the limited frequency resources. The SFN also has a shortcoming that the SFN cannot be used for analog type broadcasting due to interference caused by using the same frequency. However, the SFN can be used for the digital broadcasting system.

An Orthogonal Frequency Division Multiplexing (OFDM) scheme and a Vestigial Side Band (VSB) scheme introduced by the Advanced Television System Committee (ATSC) are representative schemes of a digital broadcasting system.

In order to support the SFN, the digital broadcasting system should employ the OFDM scheme. The OFDM scheme divides data sequence, which is transferred using one carrier, into a plurality of data sequences using a plurality of subcarriers having orthogonality and transmits the plurality of data sequences at the same time. The OFDM scheme inserts a guide interval to prevent orthogonal component from scattering due to intersymbol interference. Here, the intersymbol interference is caused due to delay during transmission. Also, the OFDM scheme improves receipt capability by enabling a receiver to recognize a plurality of signals as a multipath signal. That is, the OFDM scheme provides a better SFN environment.

The U.S. employs the VSB scheme as a transmission method. The VSB scheme transmits high quality video, audio, and additional data using single 6 MHz bandwidth and supports two broadcasting modes, a terrestrial broadcasting mode and a high-speed data broadcasting mode. Particularly, the VSB scheme symbolizes a digital signal and performs VSB modulation like a conventional analog VSB scheme and uses an 8-VSB scheme for the terrestrial broadcasting mode.

In the SFN environment, performance may be deteriorated due to the interference that is caused by signals of adjacent transmitters. In order to overcome the problem, a transmitter identification (TxID) technology was introduced. The TxID technology assigns a unique ID to each transmitter or each repeater and signals from transmitters or repeaters are identified based on the transmitter identification TxID. The transmitter identification may be inserted as a parameter-like transmitter identification information (TII), which is defined in DAB of Eureka 147 or T-DMB of South Korea. Alternatively, the transmitter identification may be inserted into a data symbol in a form of a watermark in spread frequency spectrum, which is defined in TxID of ATSC. A general receiver cannot identify the transmitter identification TxID. The transmitter identification TxID is identified by a specific receiver and used for special purpose such as network design or channel estimation. Since the transmitter identification TxID is one of representative digital data, the transmitter identification TxID will be described as digital data.

Hereinafter, an apparatus for inserting digital data according to the prior art will be described with reference to the accompanying drawings.

Figure 1:
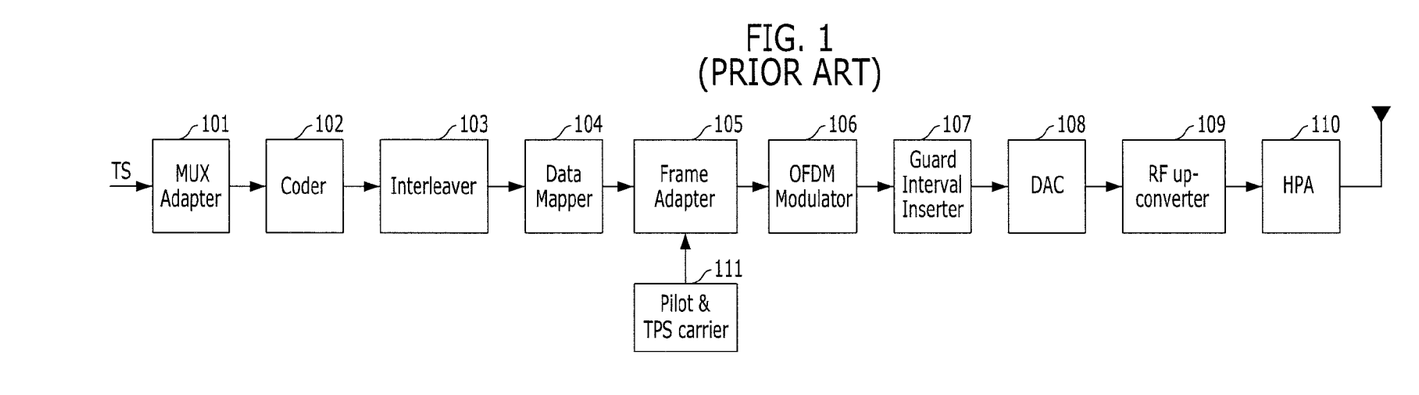
FIG. 1 is a diagram illustrating a typical Orthogonal Frequency Division Multiplexing (OFDM) system of a DVB-T transmitter.

FIG. 1 is a diagram illustrating a typical OFDM system of a DVB-T transmitter.

As shown in FIG. 1, the OFDM transmitter includes a multiplexing (MUX) adapter 101, an external and internal coder 102, an interleaver 103, a data mapper 104, a frame adapter 105, an OFDM modulator 106, a guard interval inserter 107, a digital-to-analog converter (DAC) 108, an RF up-converter 109, a high power amplifier (HPA) 110, and a pilot and transmission parameter signal (TPS) carrier inserter 111.

The operation of the typical OFDM modulation system of a DVB-T transmitter will be described.

In the typical OFDM modulation system of the DVB-T transmitter, the multiplexing adapter 101 receives a transport stream (TS) packet through a link and multiplexes the received TS packet. The external and internal coder 102 receives and encodes the multiplexed TS packet from the multiplexing adapter 101. The interleaver 103 rearranges the coded TS packet from the external and internal coder 102 to prevent consecutive error, that is, burst error. The data mapper 104 maps data. The frame adaptor 105 receives the mapped data and generates a frame in a format that is required by a corresponding network to transmit. The pilot and TPS carrier inserter 111 inserts a pilot symbol and a TPS carrier into the frame. The OFDM modulator 106 modulates the frame from the frame adaptor 105 through OFDM modulation, and the guard interval inserter 107 inserts a guard interval to prevent orthogonality from scattering due to the delay of subcarriers. The digital-to-analog converter 108 converts a digital signal to an analog signal to transmit the modulated packet to the RF up-converter 109 in order to transmit the modulated packet using wireless medium. Then, the digital-to-analog converter 108 transmits the converted packet to the RF up-converter 109. The RF up-converter 109 converts frequency to a frequency band that a system uses. The high power amplifier 110 amplifies the output of the signal according to a transmitter and transmits the signal to the antenna. The antenna transmits the signal.

Figure 2:
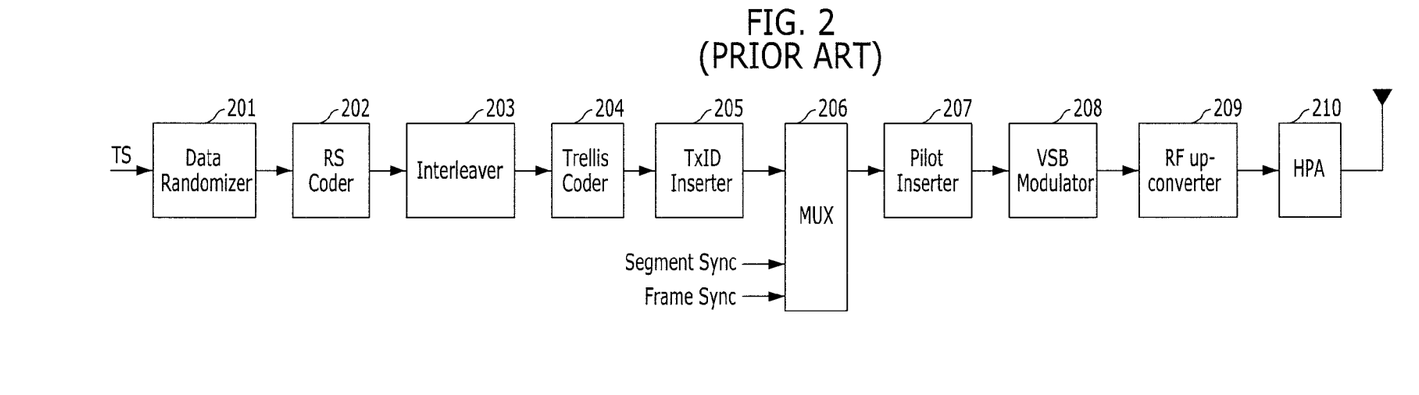
FIG. 2 is a diagram illustrating an Advanced Television Systems Committee (ATSC) Vestigial Side Band (VSB) transmitter according to the prior art.

FIG. 2 is a diagram illustrating an ATSC VSB transmitter according to the prior art.

Referring to FIG. 2, the conventional VSB transmitter includes a data randomizer 201, an RS coder 202, an interleaver 203, a trellis coder 204, a TxID inserter 205, a multiplexer (MUX) 206, a pilot inserter 207, a VSB modulator 208, an RF up-converter 209, and a high power amplifier 210.

The operation of the typical ATSC VSB transmitter will be described with reference to FIG. 2.

The data randomizer 201 arranges the TS packet to be usable in a corresponding system. The RS coder 202 inserts an RS code for error correction. The interleaver 203 regularly rearranges the RS code inserted packet to prevent burst error and to protect data. The trellis coder 204 generates 8-level (3-bit) trellis code for VSB modulation. The TxID inserter 205 inserts a transmitter identification to the trellis coded data. Although the ATSC VSB transmitter of FIG. 2 includes the TxID inserter in front of the multiplexer, the TxID inserter can be disposed behind the multiplexer. For convenience, the TxID inserter will be described as disposing in front of the multiplexer.

The multiplexer 206 performs multiplexing based on segment synchronization and frame synchronization. The pilot inserter 207 inserts a pilot signal into each frame and transmits the pilot inserted signal to the VSB modulator 208. The VSB modulator 208 receives the 8-level trellis coded signal with TxID inserted, the pilot signal, the frame and segment synchronized signal and modulates the received signals based on VSB modulation. The RF up-converter 209 converts the VSB modulated data to a radio frequency (RF) and transfers the RF to the high power amplifier 210. The high power amplifier 210 increases the output and transmits the amplified signal through an antenna.

Figure 3:
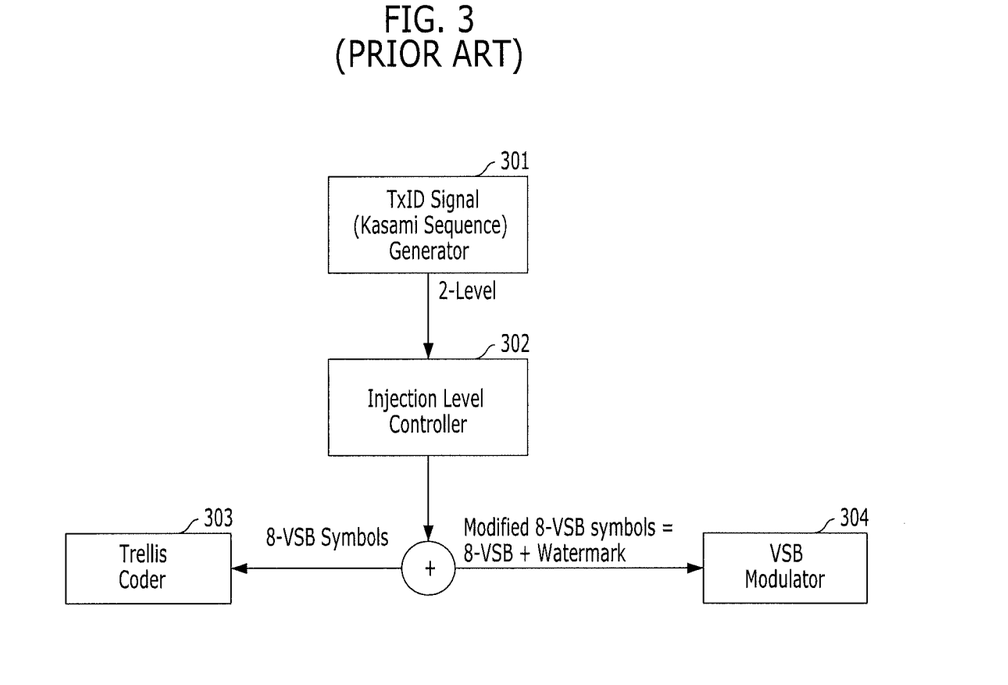
FIG. 3 is a diagram illustrating a TxID signal generator and an injection level controller for inserting a transmitter ID (TxID).

FIG. 3 is a diagram illustrating a TxID signal generator and an injection level controller for inserting a transmitter ID (TxID).

Referring to FIG. 3, a transmitter ID (TxID) of a typical ATSC transmitting and relaying device is inserted between the trellis coder 303 and the VSB modulator 304. A TxID signal generator 301, which is a 2-level kasami sequence generator, generates the transmitter ID (TxID), and an injection level controller 302 controls a size of the transmitter identification TxID suitable to the size of a 8-VBS symbol and adds the size controlled transmitter identification TxID into the symbol. The TxID inserted signal is additionally inserted into the original trellis coded symbol and is controlled not to significantly influence the original signal. The VSB modulator 304 receives the transmitter identification TxID and the 8-VSB signal and performs the VSB modulation thereon.

Figure 4:
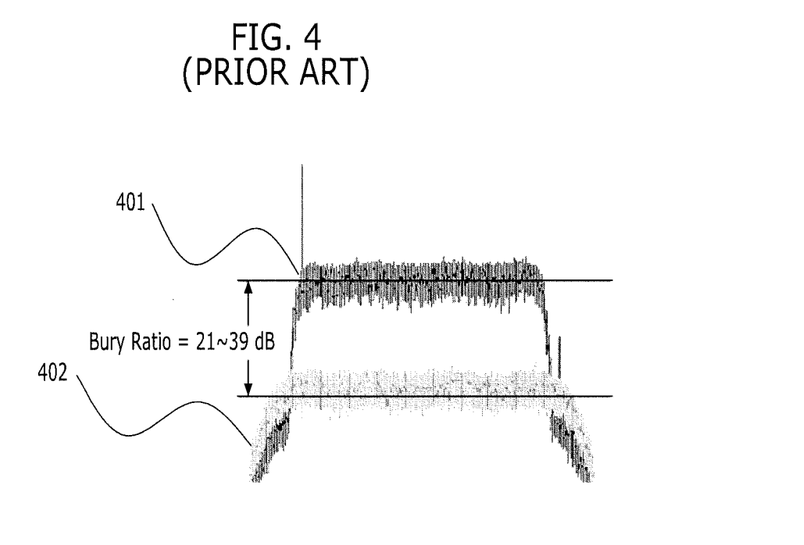
FIG. 4 is a signal level graph showing a level difference between an 8-VSB signal and a TxID signal.

FIG. 4 is a signal level graph showing a level difference between an 8-VSB signal and a TxID signal.

In FIG. 4, a curve 401 indicates a signal level of an 8-VSB signal and a curve 402 represents a signal level of additional information inserted by a broadcasting system. The two signals 401 and 402 are realized to have a level difference of about 21 to 39 dB. The reason of realizing the two signals to have the predetermined level difference is to add the additional information in the 8-VSB signal 401 as noise by inserting the transmitter identification TxID signal 402 in a small size and not to significantly influence the 8-VSB signal 401.

As described above, it is required to arrange the transmitter identification TxID inserter between the trellis coder 204 and the VSB modulator 208 for a broadcasting system to transmit the transmitter ID (TxID). However, the trellis coder 204 and the VSB modulator 208 have been integrally formed as a chip or a board in a transmitter or a repeater. Accordingly, in order to transmit the TxID, it is necessary to replace a related chip or board. Replacing the entire chip or board is very wasteful in view of economy and human resource. In case of replacing equipment due to characteristics of a broadcasting service, it is required to replace all of transmitter and repeaters in entire area. Accordingly, replacing equipment in entire area is impossible and very difficult task. Furthermore, replacing a predetermined part of system may cause incompatibility problem with existing systems.

DISCLOSURE

Technical Problem

An embodiment of the present invention is directed to providing an additional information insertion apparatus and a method thereof for inserting digital data without replacing an existing broadcasting transmitter.

Another embodiment of the present invention is directed to providing an additional information insertion apparatus and a method thereof for inserting additional information while sustaining comparability with an existing system.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an additional information insertion apparatus for a broadcasting system, which includes: a broadcasting signal transmitter configured to transmit a broadcasting signal; a data extractor configured to extract a modulated signal by dividing the modulated signal from a modulator of the broadcasting signal transmitter; an additional data generator configured to extract synchronization of the broadcasting signal from the extracted broadcasting signal, modulate the additional information based on the extracted synchronization, and generate a level of the modulated additional information to be a smaller level than a signal level of the modulated signal as much as a predetermined value; and a data synthesizer configured to insert the additional data from the data generator into the modulated broadcasting signal.

In accordance with another aspect of the present invention, there is provided a method for inserting information in a broadcasting system, which includes: obtaining synchronization from a broadcasting signal and generating additional information in a predetermined small level to the obtained synchronization; and inserting the generated additional information from a time point of generating data.

Advantageous Effects

An additional information insertion apparatus and method thereof can insert additional information without requiring replacing existing systems while sustaining comparability with existing systems.

BEST MODE FOR THE INVENTION

The advantages, features and aspects of the invention will become apparent from the following description of the embodiments with reference to the accompanying drawings, which is set forth hereinafter.

Figure 5:
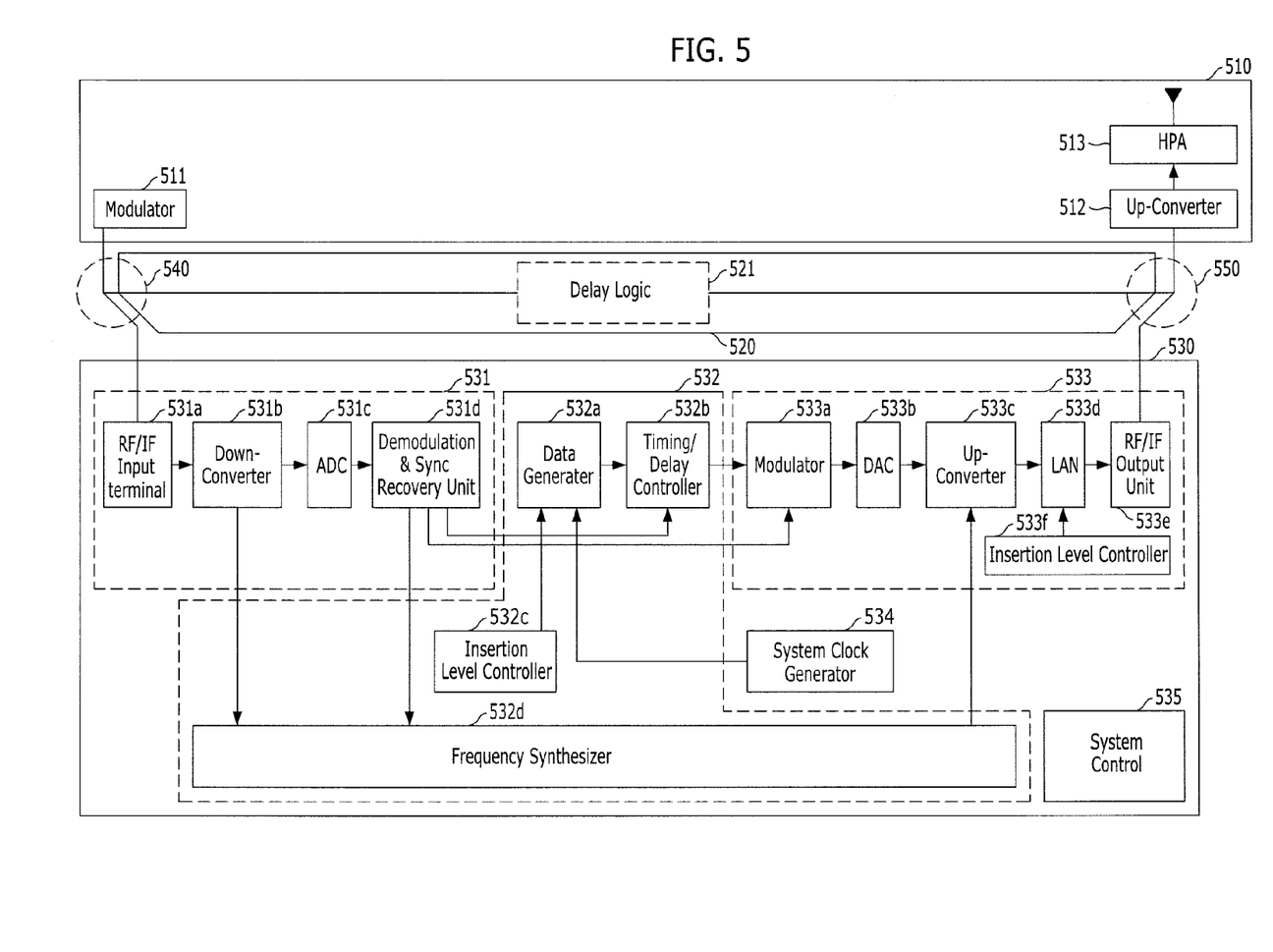
FIGS. 5 and 6 are diagrams illustrating a basic structure of an additional information insertion apparition in accordance with an embodiment of the present invention.
Figure 6:
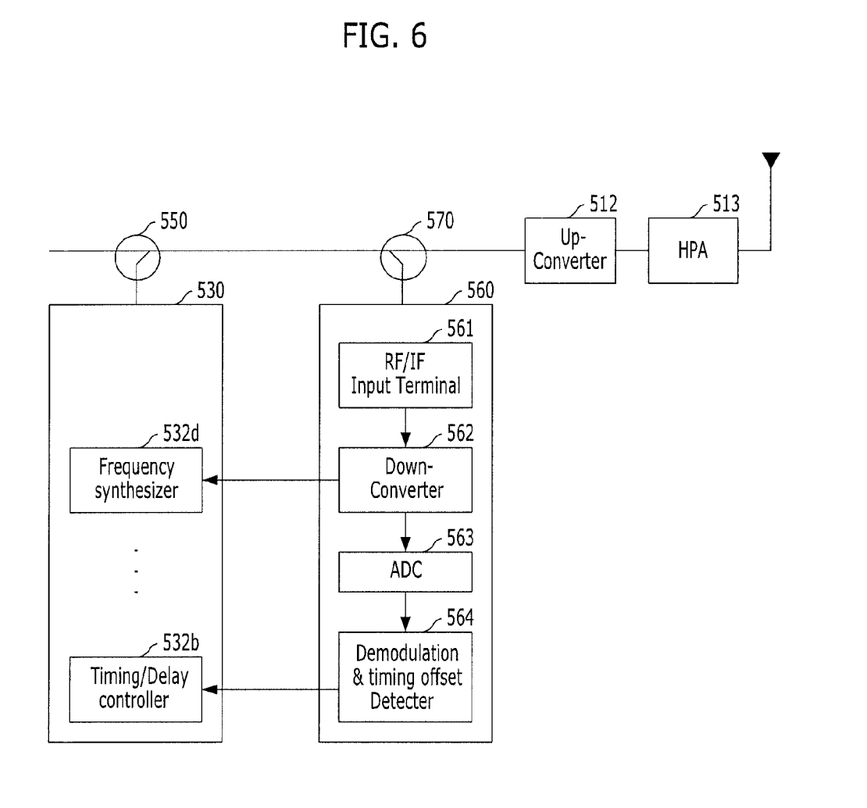

FIGS. 5 and 6 are diagrams illustrating an additional information insertion apparition in accordance with an embodiment of the present invention.

Using the basic structure of the additional information insertion apparatus shown in FIGS. 5 and 6, four embodiments of the present invention may be provided. Hereinafter, each of embodiments will be described.

An additional information insertion apparatus according to a first embodiment of the present invention includes only the structure of FIG. 5. An additional information insertion apparatus according to a second embodiment includes the basic structure of FIG. 5 without a delay controller 520. An additional information insertion apparatus according to a third embodiment includes the structure of the first embodiment with the structure shown in FIG. 6. An additional information insertion apparatus according to a fourth embodiment includes the structure of second embodiment with the structure of FIG. 5B.

<First Embodiment>

An additional information insertion apparatus according to the first embodiment of the present invention will be described based on the structure shown in FIG. 5. Referring to FIG. 5, the additional information insertion apparatus according to the first embodiment is an apparatus for inserting data that obtains synchronization information. The additional information insertion apparatus according to the first embodiment includes a Vestigial Side Band (VSB) transmitter 510, a data extractor 540, an additional data generator 530, and a data synthesizer 550. The VSB transmitter is a typical transmitter for transmitting a broadcasting signal. Although it will be referred as a VSB transmitter hereinafter for convenience in description, the present invention is not limited thereto. The VSB transmitter may be any transmitter capable of transmitting a broadcasting signal.

The additional data generator 530 is disposed between a modulator 511 of the VSB transmitter 510 and an up-converter 512. The additional data generator 530 extracts synchronization information and provides the extracted information to parts that require. The additional data generator 530 generates additional data. Here, the synchronization means frequency, timing, and frame synchronization. The additional data generator 530 includes a receiver 531, a sync controlling and data generating unit 532, a transmitter 533, a system clock generator 534, and a system controller 535.

In the additional data generator 530, the receiver 531 includes an RF/IF input unit 531a, a down-converter 531b, an analog-to-digital converter (ADC) 531c, a demodulation and sync recovery unit 531d.

The synch controlling and data generating unit 532 includes a data generator 532a, a timing/delay controller 532b, an injection level controller 532c, and a frequency synthesizer 532d.

The transmitter 533 includes a modulator 533a, a digital-to-analog converter (DAC) 533b, an up-converter 533c, a low noise amplifier (LNA) 533d, an RF/IF output unit 533e, and an injection level controller 533f.

Hereinafter, the operation of the additional information insertion apparatus according to the first embodiment will be described with reference to FIG. 5.

The modulator 511 modulates data based on VSB modulation and the up-converter 512 up-converts the modulated data to a predetermined frequency defined by a system. The up-converted signal is transmitted through transmission medium after transferred to an antenna through the high power amplifier 513. In order to insert additional data such as a transmitter ID (TxID), data is extracted and synchronization information is obtained independently from original data flow. Then, necessary additional information is inserted into an original signal.

The data extractor 540 minimizes insertion loss and extracts input data of the additional data generator independently from a main signal path. The data extractor 540 decomposes a signal without influencing a signal of a repeater or a transmitter. The RF/IF input unit 531a receives RF or IF band data from the data extractor 540, extracts target data from the received data, and transfers the extracted data to the down-converter 531b. The down-converter 531b converts the extracted signal from the RF/IF input unit 531a to an IF or baseband signal. Here, the down-converting frequency information is transferred to the frequency synthesizer 532d. The down-converting frequency information is transferred to the up-converter 533c of the transmitter 533 and used for frequency synchronization. The analog-to-digital converter 531c converts IF or baseband analog signal to a digital signal. The sampling frequency of the analog-to-digital converter 531c is controlled by the timing/delay controller 532b based on the extracted synchronization information from the demodulation and sync recovery unit 531d. The demodulation and sync recovery 531d demodulates digital data from the analog-to-digital converter 531c, obtains accurate synchronization information from the received signal, and provides the obtained synchronization information to the frequency synthesizer 532d. Therefore, accurate synchronization can be obtained. The timing/delay controller 532b may control a transmission timing of digital data generated by the data generator 532a using the obtained synchronization information from the demodulation and sync recovery unit 531d.

The data generator 532a generates additional data by modulating target additional information to insert according to a predetermined size and according to data to transmit. The additional data is generally generated as an orthogonal pseudo random code like kasami sequence in ATSC scheme.

The timing/delay controller 532b is divided into a timing controller for compensating based on the detected synchronization information from the demodulation and sync recovery unit 531d and a frame synchronizer for synchronizing with an input frame. The injection level controllers 532c and 533f uses two methods 532c and 533f. The injection level controller 532c controls the injection level based on a size of an additional signal in the data generator. The injection level controller 533f controls the amplifier itself by controlling a size of a final output or uses an attenuator. The frequency synthesizer 532d provides frequency synchronization identical to an input signal using frequency synchronization information from the down-converter 531b and the obtained frequency synchronization information from the demodulator and sync recovery unit. The frequency synthesizer 532d provides the extracted frequency synchronization information to the up-converter 533c to prevent offset when the data synthesizer 550 inserts data into the original signal. Further, the frequency synthesizer 532d helps timing recovery to reflect the timing and frame synchronization information for timing recovery to a system clock.

The modulator 533a of the transmitter 533 modulates the additional data generated according to a system that inserts data demodulated by the receiver 531. A frequency for modulation is modulated to a frequency controlled by demodulation information and synchronization information extracted from the demodulation and sync recovery unit 531d of the receiver 531. The digital-to-analog converter 533b converts digital data to analog data and transfers the analog data to the up-converter 533c. The up-converter 533c converts the frequency to a frequency band used in the system using the same frequency of the down-converter 531b of the receiver 531. The low noise amplifier 533d amplifies the up-converted signal and the RF/IF output unit 533e generates data to insert according to a band and a size required by the system. Also, the system clock generator 534 generates basic clock data for the analog-to-digital converter 531c, the digital-to-analog converter 533b, the data generator 532a, the digital demodulation and sync recovery unit 531d, and the digital modulator 533a. The system controller (MCU/PC Interface Data Parameter Controller) 535 controls an interface for inputting a digital code or inputting digital data to insert, an insertion size of digital data to insert, an interface with an operator, and overall system. Here, the digital code means a unique TxID code of a corresponding transmitter and a repeater.

The data synthesizer 550 adds additional data, which is generated by adding synchronization information in the additional data generator 530, to original data of the VSB transmitter 510. The synthesized data is transmitted to a base station or a terminal by the high power amplifier 513 through the up-converter 512.

<Second Embodiment>

An additional information insertion apparatus according to the second embodiment further includes a delay controller 520 with the constituent elements of the additional information insertion apparatus according to the first embodiment of FIG. 5. The delay controller 520 is embodied as a delay logic 521 between the modulator 511 and the up-converter 512 in the VSB transmitter 510. The delay controller 520 compensates for delay time caused due to difference between original data and data generated by the additional data generator 530.

Original data is extracted from the VSB-modulated data, which is modulated by the modulator, in order to insert additional data. The additional data generator obtains synchronization information from the extracted data and inserts the additional data into the extracted data, and the data synthesizer inserts the inserted data into original data. Through such a sequence of processes, time delay may be generated. Therefore, the delay controller is used to correct time delay between original data flow and data extracted from the original data and the additional data inserted.

FIG. 6 shows a structure that can be connected to the structure of FIG. 5. An additional information insertion apparatus according to the third embodiment of the present invention includes the constituent elements of the first embodiment with the structure of the FIG. 6, and an additional information insertion apparatus according to the fourth embodiment of the present invention includes the constituent elements of the second embodiment with the structure of FIG. 6.

<Third Embodiment>

An additional information insertion apparatus according to the third embodiment further includes a correction circuit 560 for providing accurate frequency and timing synchronization. The correction circuit 560 of FIG. 6 extracts frequency and timing information using additional data generated by the additional data generator 530 of FIG. 5 and provides accurate synchronization information by feeding back to the additional data generator 530 of FIG. 5. The data insertion apparatus according to the third embodiment includes a data extractor 570 for extracting additional data generated by the additional data generator 530 and a correction circuit 560 for extracting frequency and timing information using the extracted data and feeding back the extracted frequency and timing information. The correction circuit 560 includes an RF/IF input unit 561, a down-converter 562, an analog-to-digital converter 563, and a demodulation and timing offset detector 564.

The operation of the data inserting apparatus according to the third embodiment will be described with reference to FIG. 5B.

The data extractor 570 extracts data for obtaining data synchronization information generated by the additional data generator 530 and transmits the extracted data to the RF/IF input unit 561. The RF/IF input unit 561 extracts a target signal from the RF or IF band input signal and transfers the extracted signal to the down-converter 562. The down-converter 562 converts an RF/IF signal to an IF or baseband signal and transfers the IF or baseband signal to the analog-to-digital converter 563. The down-converter 562 also provides the down-converted frequency to the frequency synthesizer 532d and extracts further accurate frequency synchronization using the down-converted frequency. The analog-to-digital converter 563 converts the analog signal to a digital signal and transfers the digital signal to the demodulation and timing offset detector 564. The demodulation and timing offset detector 564 demodulates the baseband signal, extracts timing synchronization information, and provides the extracted timing synchronization information to the timing/delay controller of the additional data generator 530 to provide further accurate timing synchronization information.

<Fourth Embodiment>

An additional information insertion apparatus according to the fourth embodiment further includes the delay controller 520 with the constituent elements of the second embodiment. The operation of the data insertion apparatus according to the fourth embodiment is identical to that of the third embodiment except the operation of the delay controller 520. The delay controller 520 compensates for a processing time between an original signal and a signal extracted from the data extractor 530.

Figure 7:
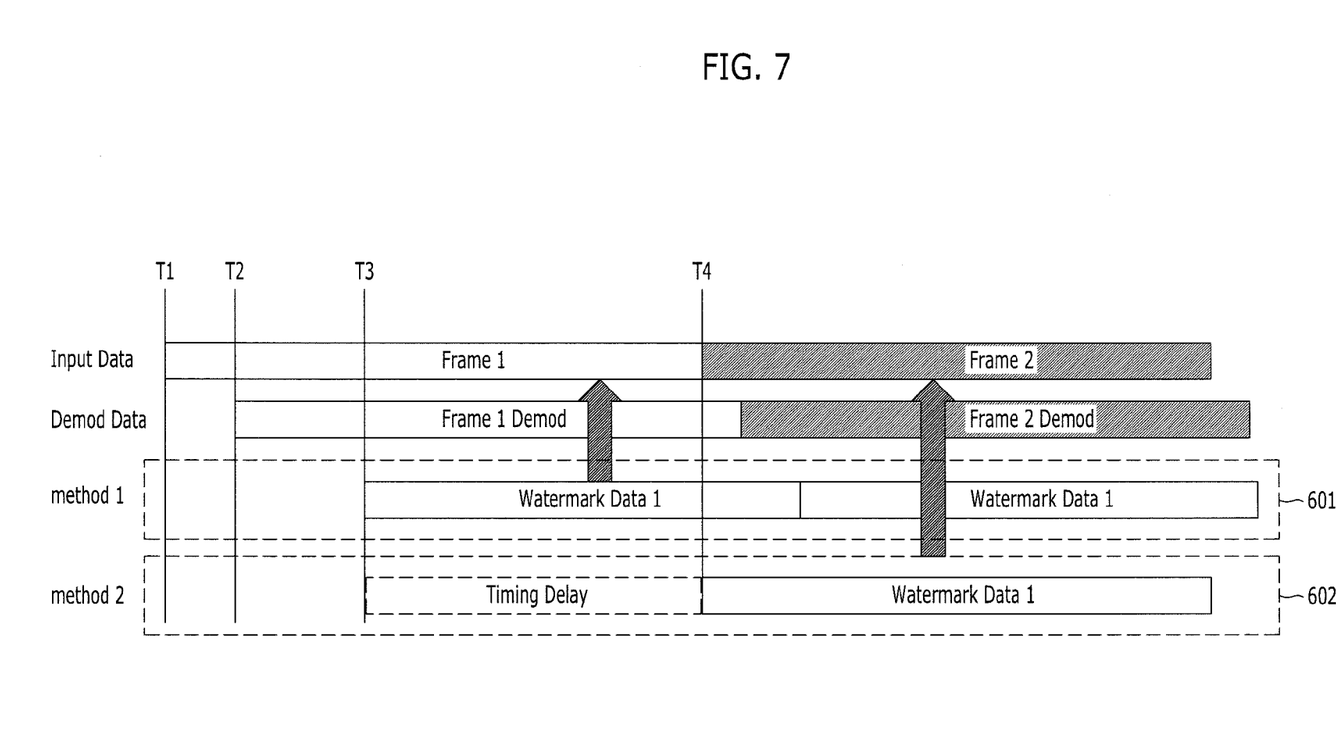
FIG. 7 is a diagram illustrating locations of inserting additional data generated when frame synchronization is performed or when frame synchronization is not performed.

FIG. 7 is a diagram illustrating locations of inserting additional data generated when frame synchronization is performed or when frame synchronization is not performed. In FIGS. 7, T1 and T2 denote time points of a frame that are provided for frame synchronization. T3 denotes a time point of a frame for generating additional data by a first method 601. In the first method 601, additional data is inserted from the time point T3 without performing frequency synchronization. The additional data is converted from digital to analog, modulated, and inserted as analog signal. In a second method 602, generated data is delayed as long as a predetermined time to obtain timing synchronization and inserted accurately at a time point T4 of the next frame.

Figure 8:
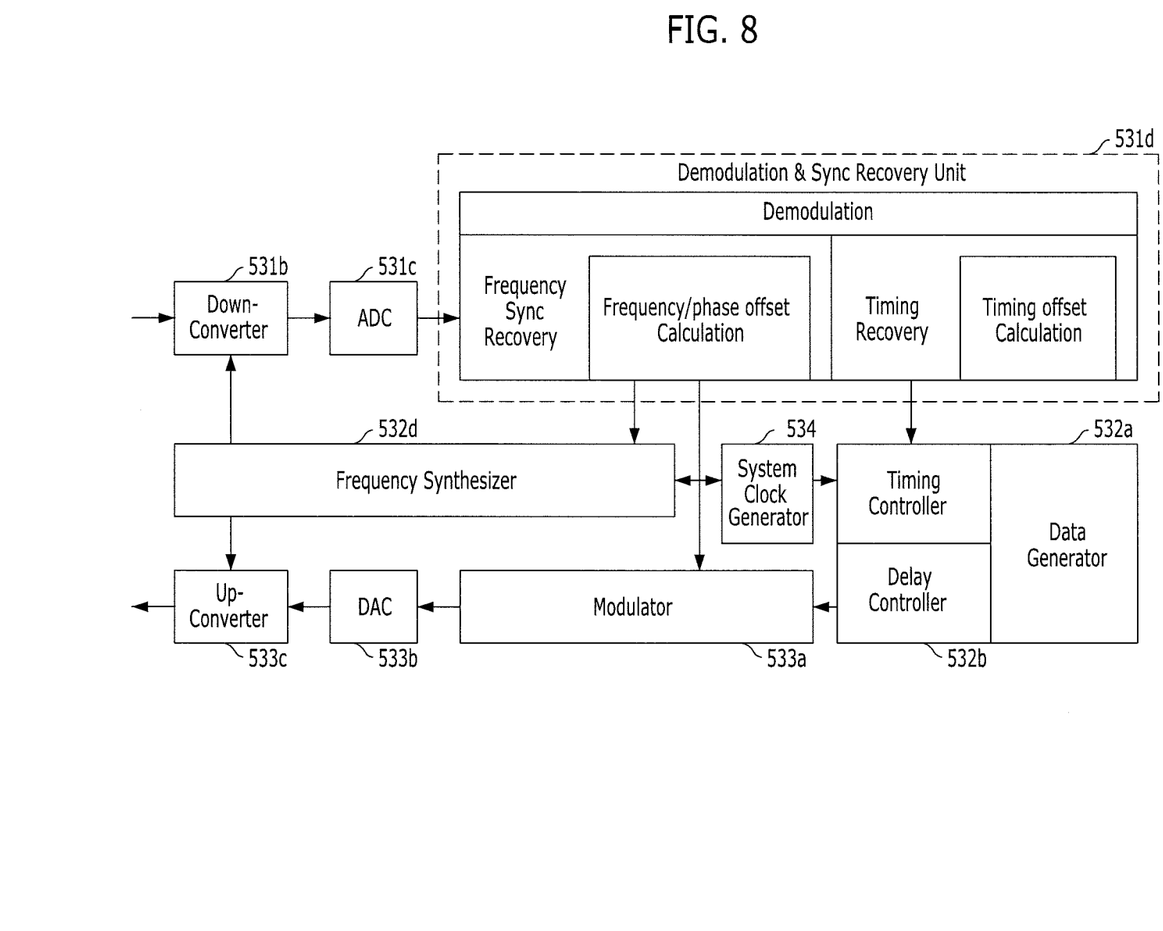
FIG. 8 is a block diagram illustrating an internal structure of an additional data generator and a connection relation thereof in accordance with an embodiment of the present invention.

FIG. 8 is a block diagram illustrating an internal structure of an additional data generator and a connection relation thereof in accordance with an embodiment of the present invention.

In FIG. 8, the additional information insertion apparatus performs the second method 602 shown in FIG. 7.

The down-converter 531b and the up-converter 533c convert frequency based on the identical frequency provided from the frequency synthesizer 532d. The demodulation and sync recovery unit 531d includes a demodulator, a frequency and phase sync recovery unit, and a timing recovery unit. The demodulator demodulates a digital signal from the receiver 531. The frequency and phase sync recovery unit calculates frequency and phase offset and corrects a frequency and phase. The timing recovery unit calculates timing offset information, corrects the timing offset information, and transmits the corrected timing offset information to the timing/delay controller 532b. After correcting frequency and phase, the corrected signal is transmitted to the frequency synthesizer 532d and the modulator 533a. Based on the calculated offset information, the down-converted signal is accurately demodulated to a baseband signal, and the newly generated additional data may be generated and inserted based on the same frequency, phase, and timing information of the original data.

Figure 9:
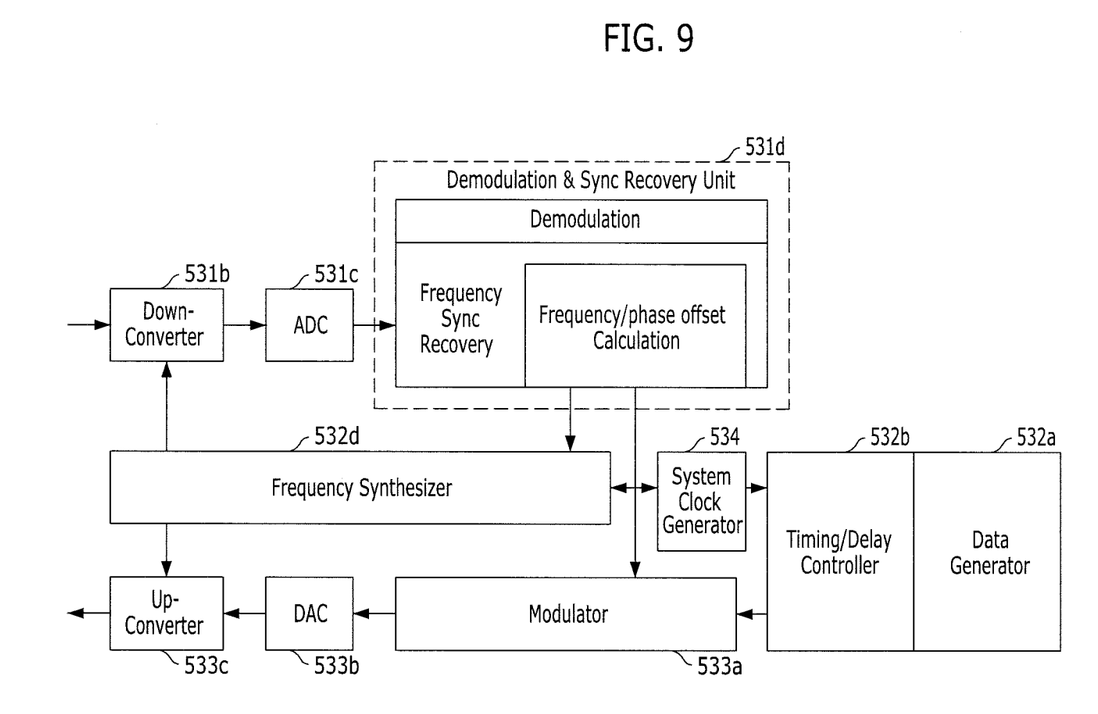
FIG. 9 is a block diagram illustrating an additional information insertion apparatus having synchronization information except frame synchronization information.

FIG. 9 is a block diagram illustrating an additional data insertion apparatus having synchronization information except frame synchronization information.

FIG. 9 shows an additional data inserting apparatus that inserts additional data at a time of generating additional information without using the frame synchronization of the first method 601 of FIG. 7. In FIG. 9, it is not required to include a timing recovery unit in the demodulation and sync recovery unit 531d because the additional data is inserted at the time of generating the data. Since the operation of the additional information inserting apparatus of FIG. 9 is identical to that of FIG. 8 except the timing recovery unit, detailed description thereof is omitted.

Figure 10:
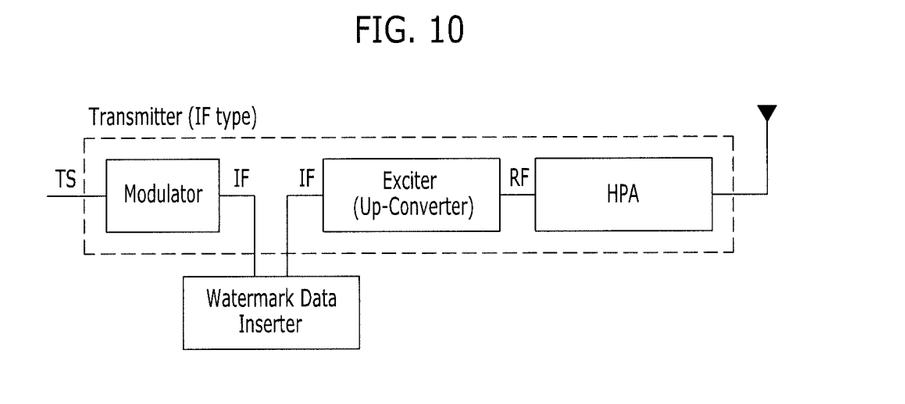
FIGS. 10 to 12 are block diagrams illustrating examples of applying an additional information insertion apparatus of the present invention in a broadcasting transmitter.
Figure 11:
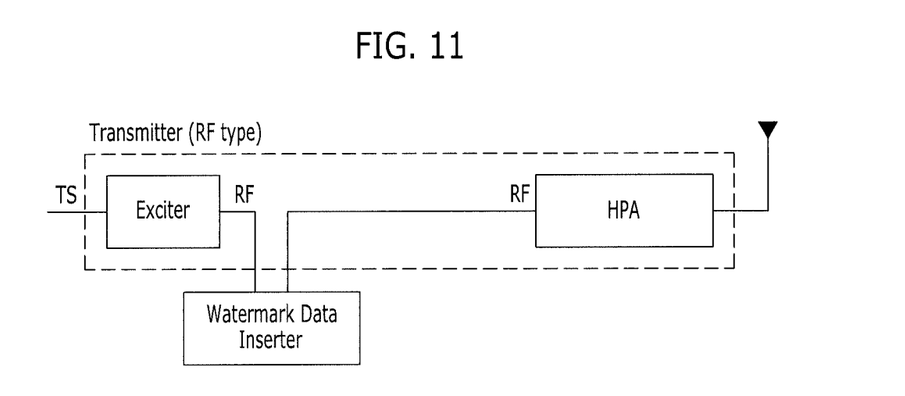
Figure 12:
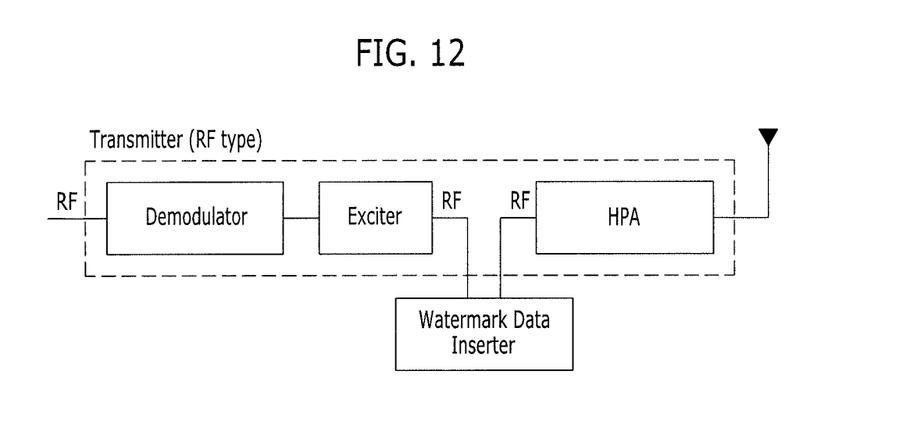

FIGS. 10 to 12 are block diagrams illustrating examples of applying an additional information insertion apparatus of the present invention in a broadcasting transmitter.

As shown in FIG. 10, the additional information insertion apparatus according to the present embodiment is disposed in an IF signal connecting block, that is, between a modulator and an exciter in the IF transmitter. The exciter performs the same operation of the up-converter. Although it is expressed as the exciter, it may be expressed as a frequency converter. FIG. 11 shows inserting additional data in an RF signal connecting block, that is, between the exciter and the high power amplifier in an RF transmitter. FIG. 12 shows the additional information insertion apparatus is disposed between an exciter and a high power amplifier in an RF repeater. However, the present invention is not limited to the shown examples.

As described above, the additional information insertion apparatus according to the present embodiment can insert additional data by selecting a location to insert the additional information in a transmitter or a repeater. Therefore, it is possible to apply a function of generating a transmitter identification signal or inserting additional data without changing existing transmitter or repeater by adding the additional information insertion apparatus unlike the convention method that requires adding a transmission module of a transmitter or a repeater for inserting predetermined data in a TS packet.

The present application contains a subject matter related to Korean Patent Application No. 10-2008-0118019, filed with the Korean Intellectual Property Office on Nov. 26, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. An additional information insertion apparatus for a broadcasting system, comprising: a broadcasting signal transmitter configured to transmit a broadcasting signal; a data extractor configured to extract a modulated signal by dividing the modulated signal from a modulator of the broadcasting signal transmitter; an additional data generator configured to extract synchronization of the broadcasting signal from the extracted broadcasting signal, generate additional data, modulate the additional data based on the extracted synchronization, and generate a level of the modulated additional data to be a smaller level than a signal level of the modulated signal as much as a predetermined value; and a data synthesizer configured to insert the additional data from the data generator into the modulated broadcasting signal.

2. The additional information insertion apparatus of claim 1, wherein the broadcasting signal transmitter uses the same method of modulating the broadcasting signal to modulate the additional data.

3. The additional information insertion apparatus of claim 1, further comprising:
a delay controller configured to delay the modulated signal of the broadcasting signal transmitter as long as a processing delay time of the additional data generator.

4. The additional information insertion apparatus of claim 1, further comprising:
a second data extractor configured to divide a predetermined part of the broadcasting signal having the additional data; and
a correction circuit configured to obtain synchronization information from the divided data and output the obtained synchronization information,
wherein the additional data generator further corrects synchronization of the broadcasting signal and the additional data using the synchronization information provided from the correction circuit.

5. The additional information insertion apparatus of claim 1, wherein the additional data generator includes:
a receiver configured to obtain synchronization information from the extracted signal from the data extractor;
a sync controlling and data generating unit configured to generate additional data to be synchronized with the broadcasting signal using synchronization information provided from the receiver; and
a transmitter configured to convert data generated from the synchronization controlling and data generating unit as a level of the modulator, and transmit the converted data to the data synthesizer.

6. The additional information insertion apparatus of claim 5, wherein the receiver includes:
an RF/IF input unit configured to receive an extracted signal from the data extractor;

a down-converter configured to convert the received signal of the RF/IF input unit to a baseband;

an analog-to-digital converter configured to convert an analog signal to a digital signal by receiving data from the down-converter; and a demodulator and sync recovery unit configured to obtain synchronization information by demodulating the converted data from the analog-to-digital converter.

7. The additional information insertion apparatus of claim 5, wherein the synchronization controlling and data generating unit includes:

a data generator configured to generate additional data; and a timing/delay controller configured to control timing and synchronization with an input frame based on synchronization detected in the receiver.

8. The additional information insertion apparatus of claim 7, further comprising an injection level controller configured to control an injection level based on a size of additional signal generated by the data generator.

9. The additional information insertion apparatus of claim 7, further comprising:

a frequency synthesizer configured to provide frequency synchronization information collected from the down-converter and frequency synchronization information collected from the demodulator and sync recovery unit.

10. The additional information insertion apparatus of claim 5, wherein the transmitter includes:

a modulator configured to modulate the generated additional data from the receiver identically to a signal of the broadcasting signal transmitter;

a digital-to-analog converter configured to convert digital data modulated from the modulator to analog data;

an up-converter configured to convert frequency to a frequency band that a system use using a same frequency of the down-converter;

a low noise amplifier configured to amplify the frequency up-converted signal; and an RF/IF output unit configured to generate data to be inserted in a band and a size required by a system based on the amplified signal from the low noise amplifier.

11. The additional information insertion apparatus of claim 4, wherein the correction circuit includes:

an RF/IF input unit configured to extract a target signal from an RF or IF band input signal received from the data extraxtor;

a down-converter configured to perform down-converting of the target signal from the RF/IF input unit to an IF or a baseband signal and provide frequency information to a frequency synthesizer of the additional data generator;

an analog-to-digital converter configured to convert an analog signal of the down-converter to a digital signal; and a demodulator and timing offset detector configured to demodulate the converted data to a baseband signal, extract timing synchronization information, and provide synchronization information to a timing/delay controller of the additional data generator.

12. A method for inserting information in a broadcasting system, comprising: modulating a broadcasting signal and transmitting the modulated broadcasting signal; extracting the broadcasting signal by dividing the modulated broadcasting signal; extracting synchronization of the broadcasting signal from the extracted broadcasting signal, generating additional data, modulating the additional data based on the extracted synchronization, and generating a level of the modulated additional data to be a smaller level than a level of the modulated broadcasting signal as much as a predetermined value; and inserting the generated additional data into the modulated broadcasting signal.

13. The method of claim 12, further comprising:

delaying the modulated broadcasting signal as long as a processing delay time of the generation the a level of the modulated additional data.

14. The method of claim 12, wherein the additional data is inserted from a time point of the generation a level of the modulated additional data.

15. The method of claim 12, wherein the additional data is inserted at frame synchronization.

* * * * *

UNITED STATES PATENT AND TRADEMARK OFFICE
CERTIFICATE OF CORRECTION

PATENT NO. : 8,675,691 B2
APPLICATION NO. : 13/131188
DATED : March 18, 2014
INVENTOR(S) : Park et al.

Page 1 of 1

It is certified that error appears in the above-identified patent and that said Letters Patent is hereby corrected as shown below:

On the Title Page Item [73] (Assignee), Line 3, Insert Second Assignee -- Korean Broadcasting System, Seoul (KR) --.

Signed and Sealed this
Sixth Day of January, 2015

Michelle K. Lee
*Deputy Director of the United States Patent and Trademark Office*